United States Patent
Hammer et al.

(10) Patent No.: US 12,281,669 B2
(45) Date of Patent: Apr. 22, 2025

(54) ARRANGEMENT OF A FASTENING CLIP ON A CONNECTING DEVICE WHICH IS WELDED ONTO A MOTOR VEHICLE COMPONENT, AND METHOD FOR PRODUCING AN ARRANGEMENT OF A FASTENING CLIP ON A CONNECTING DEVICE WHICH IS WELDED ONTO A VEHICLE COMPONENT

(71) Applicant: Bayerische Motoren Werke Aktiengesellschaft, Munich (DE)

(72) Inventors: Maik Hammer, Bruckberg (DE); Johann Niekerk, Munich (DE); Frank Woellecke, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 552 days.

(21) Appl. No.: 17/599,398

(22) PCT Filed: Feb. 27, 2020

(86) PCT No.: PCT/EP2020/055087
§ 371 (c)(1),
(2) Date: Sep. 28, 2021

(87) PCT Pub. No.: WO2020/200592
PCT Pub. Date: Oct. 8, 2020

(65) Prior Publication Data
US 2022/0194484 A1   Jun. 23, 2022

(30) Foreign Application Priority Data
Mar. 29, 2019   (DE) .................. 10 2019 108 146.7

(51) Int. Cl.
*F16B 5/06* (2006.01)
*B62D 27/06* (2006.01)

(52) U.S. Cl.
CPC ............ *F16B 5/0657* (2013.01); *B62D 27/06* (2013.01)

(58) Field of Classification Search
CPC ....... B60R 2011/005; B60R 2011/0059; B60R 2011/0064; B60R 2011/0071;
(Continued)

(56) References Cited

U.S. PATENT DOCUMENTS

| | | | |
|---|---|---|---|
| 5,502,942 A | 4/1996 | Gras et al. | |
| 8,272,613 B2 * | 9/2012 | Golle | F16B 5/0657 248/74.1 |

(Continued)

FOREIGN PATENT DOCUMENTS

| | | |
|---|---|---|
| CN | 104350295 A | 2/2015 |
| CN | 107851986 A | 3/2018 |

(Continued)

OTHER PUBLICATIONS

English-language Chinese Office Action issued in Chinese application No. 202080009976.9 dated Jun. 29, 2022 (Seven (7) pages).

(Continued)

*Primary Examiner* — Josh Skroupa
(74) *Attorney, Agent, or Firm* — Crowell & Moring LLP

(57) ABSTRACT

An arrangement includes a fastening clip, a connecting device, where the connecting device has at least two connecting elements, and a motor vehicle component. The connecting device is welded on the motor vehicle component. The fastening clip engages behind the connecting device in a gap formed by the at least two connecting elements and delimited by the motor vehicle component.

4 Claims, 1 Drawing Sheet

(58) Field of Classification Search
CPC ...... B60R 2013/018; B60R 2013/0293; B62D 27/023; B62D 27/06; F16B 5/0208; F16B 5/0642; F16B 5/0657; F16B 5/0664; F16B 21/12; F16B 21/125; F16B 21/14; F16B 2200/69; F16B 2200/71; Y10T 403/58; Y10T 403/581; Y10T 403/587
USPC .......................................... 403/315, 316, 319
See application file for complete search history.

(56) References Cited

U.S. PATENT DOCUMENTS

| | | | |
|---|---|---|---|
| 9,222,500 B2* | 12/2015 | Herzinger | F16B 5/0642 |
| 9,296,923 B2* | 3/2016 | Herzinger | F16B 5/0642 |
| 9,382,928 B2 | 7/2016 | van Niekerk et al. | |
| 9,687,928 B2* | 6/2017 | Van Niekerk | F16B 5/08 |
| 9,751,282 B2* | 9/2017 | Van Niekerk | F16B 5/0657 |
| 9,855,978 B2* | 1/2018 | Lankenau | F16B 5/0664 |
| 10,072,688 B2* | 9/2018 | Hammer | F16B 5/0664 |
| 10,314,371 B2* | 6/2019 | van Niekerk | F16B 21/165 |
| 10,549,703 B2* | 2/2020 | Korber | F16B 21/186 |
| 10,718,367 B2* | 7/2020 | Laudan | F16B 21/12 |
| 10,738,812 B2* | 8/2020 | Hammer | F16B 5/0642 |
| 11,266,209 B2* | 3/2022 | Van Niekerk | F16B 5/0657 |
| 2010/0001152 A1 | 1/2010 | Golle et al. | |
| 2014/0201959 A1 | 7/2014 | van Niekerk et al. | |
| 2016/0025126 A1* | 1/2016 | Laudan | F16B 21/12 403/376 |
| 2016/0123363 A1* | 5/2016 | Hammer | F16B 5/0664 24/708.6 |
| 2016/0262500 A1 | 9/2016 | van Niekerk et al. | |

FOREIGN PATENT DOCUMENTS

| | | | |
|---|---|---|---|
| DE | 1 109 237 B | 6/1961 | |
| DE | 10 2009 055 866 A1 | 7/2010 | |
| DE | 10 2011 087 286 A1 | 2/2013 | |
| DE | 10 2013 214 269 B3 | 6/2014 | |
| DE | 10 2014 200 552 B3 | 1/2015 | |
| DE | 102013018876 A1 * | 5/2015 | ............... F16B 5/07 |
| DE | 10 2014 207 290 A1 | 10/2015 | |
| DE | 10 2016 209 875 A1 | 12/2017 | |
| DE | 10 2016 212 058 A1 | 1/2018 | |
| EP | 0 964 195 A1 | 12/1999 | |
| EP | 2698549 A1 * | 2/2014 | ........... F16B 5/0642 |
| EP | 2 734 738 B1 | 5/2014 | |

OTHER PUBLICATIONS

PCT/EP2020/055087, International Search Report dated Jun. 23, 2020 (Two (2) pages).

German Search Report issued in German application No. 10 2019 108 146.7 dated Jan. 16, 2020, with Statement of Relevancy (Ten (10) pages).

* cited by examiner

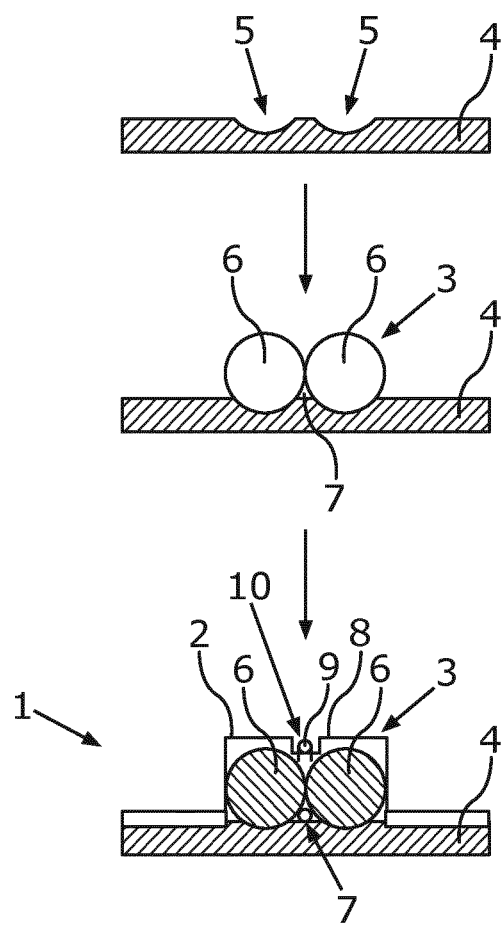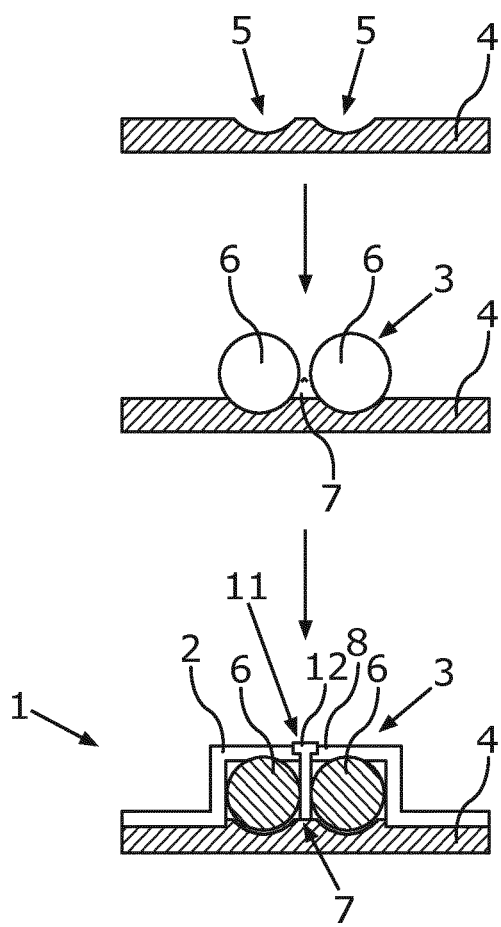

ARRANGEMENT OF A FASTENING CLIP ON A CONNECTING DEVICE WHICH IS WELDED ONTO A MOTOR VEHICLE COMPONENT, AND METHOD FOR PRODUCING AN ARRANGEMENT OF A FASTENING CLIP ON A CONNECTING DEVICE WHICH IS WELDED ONTO A VEHICLE COMPONENT

BACKGROUND AND SUMMARY OF THE INVENTION

The invention relates to an arrangement of a fastening clip on a connecting device which is welded on a motor vehicle component and to a method for producing an arrangement of a fastening clip on a connecting device which is welded on a vehicle component.

A component connection with a first component, from which a male fixing element protrudes and which wholly or partially has the form of a sphere, is already known from EP 2 734 738 B1. The male fixing element is welded to the first component. The first component is connected to a second component in a frictional engagement and/or form fit by means of a sleeve-like or cap-like clip element which is plugged on the male fixing element. The clip element consists of a plastics material and engages behind the male fixing element in a form fit.

It is an object of the present invention to provide an arrangement of a fastening clip on a connecting device which is welded on a motor vehicle component and also a method for producing an arrangement, which arrangement and method make it possible to clip the fastening clip onto the connecting device in a particularly simple manner and at the same time ensure a particularly secure connection of the fastening clip to the connecting device.

This object is achieved according to the invention by an arrangement of a fastening clip on a connecting device which is welded on a motor vehicle component and also by a method for producing an arrangement.

A first aspect of the invention relates to an arrangement of a fastening clip on a connecting device which is welded on a motor vehicle component. The connecting device comprises at least one connecting element, behind which the fastening clips engage in the arrangement. In order to ensure a particularly simple plugging of the fastening clip onto the connecting device with a simultaneous particularly secure retention of the fastening clip on the connecting device, it is provided according to the invention that the connecting device comprises at least two connecting elements, and the fastening clip engages behind the connecting device in a gap formed by the connecting elements and delimited by the motor vehicle component. The two connecting elements are welded in particular next to one another on the motor vehicle component and delimit the gap laterally in each case. The gap thus runs between the two connecting elements. This gap running between the connecting elements is delimited by the connecting elements together with the motor vehicle component. In the case of a spaced-apart arrangement of the connecting elements on the motor vehicle component, the gap is open in certain regions at the periphery, whereas in the case of a mutually touching arrangement of the connecting elements, the gap is enclosed at the periphery completely by the connecting elements and the motor vehicle component. To produce the arrangement, the fastening clip is plugged onto the connecting elements on a side facing away from the motor vehicle component, as a result of which the connecting device is encapsulated at least in certain regions by the sleeve-like fastening clip. The plugging-on operation allows the fastening clip to be arranged on the connecting device in a particularly simple manner. In the state in which it is plugged-on the connecting device, the fastening clip engages behind the connecting device in the gap, as a result of which the fastening clip is fastened particularly securely to the connecting device and, by way of the connecting device, to the motor vehicle component. The fastening clip makes it possible, for example, to fasten a further motor vehicle component to the motor vehicle component. The fastening clip can be fitted over the connecting device by an assembler and/or by a robot device with a particularly low expenditure of force, the engaging-behind action ensuring that the fastening clip is fastened to the motor vehicle component in a particularly secure manner.

It has proven to be advantageous in particular if the connecting elements are in the form of spheres. In this respect, it is provided in particular that at least those connecting elements which are welded to the motor vehicle component are in the form of spheres, it being possible to freely select the form of further connecting elements of the connecting device. The connecting elements in the form of spheres have the advantage of being able to be fastened to the motor vehicle component in a particularly secure manner by way of being welded to the motor vehicle component, the gap in which the fastening clip engages behind the connecting device in the arrangement being provided at the same time on account of the spherical shape of the connecting elements. The spherical connecting elements may be metal spheres, for example, which are welded on a surface of the motor vehicle component. The spherical shape of the connecting elements furthermore has the advantage that the connecting elements have a particularly stable design on account of the spherical shape thereof. As an alternative, it is possible for at least one of the connecting elements to be a ring, which can also be referred to as a washer. For a particularly secure fastening of the fastening clip to the connecting device, the fastening clip may engage behind the at least one connecting element in the form of a ring in an opening of the ring. Forming the at least one connecting element as a ring with the opening behind which the fastening clip can engage makes it possible to fasten the fastening clip to the motor vehicle component by way of the gap and/or the opening in a particularly secure manner. By way of example, the fastening clip engages into the opening of the connecting element and engages behind the connecting element in the opening.

It is provided in a further advantageous configuration of the invention that the connecting elements are welded to one another. This means that the connecting elements are both welded to the motor vehicle component and have a mutual point of contact at which a first one of the connecting elements is welded to a second one of the connecting elements, both the first connecting element and the second connecting element being welded to the surface of the motor vehicle component. The welding of the connecting elements to one another allows a particularly fixed connection between the connecting elements, the connecting elements together with the motor vehicle component completely enclosing the gap over its periphery. In this way, when the fastening clip engages behind the gap, it can be ensured that the fastening clip is fastened to the motor vehicle component by way of the connecting device in a particularly secure manner.

In a further configuration of the invention, it has been shown to be advantageous if the fastening clip comprises a cap-like basic element, which can be fitted over the connecting device, and a retaining element, by means of which the engaging action of the fastening clip behind the connecting device can be released. The cap-like basic element makes it possible to plug the fastening clip onto the connecting device by fitting the fastening clip onto the connecting device. The retaining element may be formed in one piece with the basic element or be formed separately from the basic element. The retaining element engages behind the connecting device in the gap in order to ensure that the fastening clip is fastened to the connecting device in a particularly secure manner. In the case of a one-piece configuration of the basic element with the retaining element, the retaining element may be pivotable and/or movable relative to the basic element, with the result that, when the cap-like basic element is being plugged onto the connecting device, the retaining element can be displaced for a particularly simple plugging-on action and, in the state in which the fastening clip is plugged on the connecting device, engages into the gap in order to engage behind the connecting device in the gap and to allow the fastening clip to be fastened to the connecting device in a particularly secure manner.

It has also proven to be advantageous if the retaining element is in the form of a securing ring which engages behind the gap. In this respect, the retaining element is formed separately from the basic element. To fix the fastening clip to the connecting device, the basic element can be fitted over the connecting device and the securing ring can be drawn through the gap and arranged such that it engages behind the basic element at least in certain regions, in order to fix the basic element to the connecting device. The securing ring, which engages behind the connecting device, makes it possible to clamp the basic element to the connecting element, for example. The securing ring makes it possible for the fastening clip to be fastened to the connecting device in a particularly simple and secure manner.

In an alternative configuration of the invention, it has proven to be advantageous if the retaining element is in the form of an expansion pin which can be plugged into an opening in the basic element, as a result of which the basic element can be set to a state in which it engages behind the connecting device. This means that the basic element can be plugged onto the connecting device in a state in which it does not engage behind the connecting device. In the state in which the basic element is plugged on the connecting device, the expansion pin is plugged into the opening of the basic element, as a result of which the basic element is adjusted from the state in which it does not engage behind the connecting device to the state in which it engages behind the connecting device, in order to fasten the fastening clip to the connecting device in a particularly secure manner. In the state in which the fastening clip is clipped on the connecting device, the opening in the basic element may run for example perpendicular to a direction of longitudinal extent of the gap and/or perpendicular to a plane formed by the surface of the motor vehicle component in the region of the welded-on connecting elements of the connecting device and/or parallel to the gap. The expansion pin plugged in the opening changes a geometry of the basic element compared with an initial state of the basic element in such a way that the basic element engages behind the gap in the state in which the expansion pin is plugged in the opening. When the expansion pin is arranged outside the opening, the basic element does not engage behind the gap. The formation of the retaining element as the expansion pin has the advantage that, in a state in which it is spaced apart from the expansion pin, the basic element can be clipped onto the connecting device in a particularly simple manner and then the fastening clip can be fastened securely to the connecting device in a particularly simple manner by inserting the expansion pin into the opening of the basic element.

In this connection, it has proven to be advantageous if the opening runs between at least two of the connecting elements. In particular, in the state in which the fastening clip is clipped on the connecting device, the opening runs between the connecting elements of the connecting device that are welded to the motor vehicle component. When the opening is arranged between the two connecting elements, the expansion pin, which can be inserted into the opening, can thus press the basic element apart in a region arranged between the connecting elements, as a result of which the basic element can engage behind the gap in the region arranged between the connecting elements and thus be fastened securely to the connecting device. If the connecting device comprises three connecting elements, each of which being welded to the motor vehicle component and which are arranged relative to one another in the shape of a triangle, the opening can run in the shape of the triangle between the connecting elements. In particular, in this respect the opening runs perpendicular to the plane provided by the surface of the motor vehicle component in the region of the welded-on connecting device. The advantage of arranging the opening between the connecting elements is that when the expansion pin is arranged in the opening the basic element is deformed only in certain regions, in particular in a region close to the gap in the state in which the basic element is clipped on the connecting device.

The invention furthermore relates to a method for producing an arrangement as has already been described in connection with the arrangement according to the invention. In the method, the fastening clip is plugged onto the connecting device, which is welded to a motor vehicle component and comprises the at least one connecting element, the fastening clip engaging behind the connecting device in the gap enclosed by at least two connecting elements of the connecting device with the motor vehicle component. This means that, to produce the arrangement, the fastening clip is fitted over the connecting device and a particularly secure connection between the fastening clip and the connecting device is produced, in that the fastening clip engages into the gap and thus engages behind the connecting device in the gap.

Advantages and advantageous refinements of the arrangement according to the invention should be regarded as advantages and advantageous refinements of the method according to the invention, and vice versa. For this reason, the further advantages and advantageous refinements of the method according to the invention are not described again here.

Further features of the invention will emerge from the claims, the figures and the description of the figures. The features and combinations of features mentioned above in the description as well as the features and combinations of features mentioned below in the description of the figures and/or shown in the figures alone can be used not only in the respectively specified combination, but also in other combinations or individually.

The invention will now be explained in more detail on the basis of a preferred exemplary embodiment and with reference to the drawings.

BRIEF DESCRIPTION OF THE DRAWINGS

FIG. 1 shows a method diagram for producing an arrangement of a fastening clip on a connecting device, which is welded on a motor vehicle component and in the present case comprises two connecting elements which are connected to one another and each of which is welded on the motor vehicle component, in the arrangement a basic element of the fastening clip being fitted over the connecting device and a securing ring of the fastening clip engaging behind the connecting device in a gap enclosed at the periphery by the motor vehicle component and the connecting elements; and FIG. 2 shows a method diagram for producing an alternative embodiment of the arrangement, in which the two connecting elements of the connecting device are welded on the motor vehicle component spaced apart from one another, the basic element of the fastening clip is fitted over the two connecting elements of the connecting device, and the fastening clip is spread by way of an expansion pin plugged in an opening of the basic element, as a result of which the basic element of the fastening clip engages behind the connecting device in a gap delimited at the periphery at least in certain regions by the motor vehicle component and the connecting elements.

DETAILED DESCRIPTION OF THE DRAWINGS

FIGS. 1 and 2 show respective method diagrams for producing an arrangement 1 of a fastening clip 2 on a connecting device 3, which is welded on a motor vehicle component 4. The arrangement 1 makes it possible to connect further motor vehicle components to the motor vehicle component 4 in a particularly simple manner, as a result of which a motor vehicle, in particular a motor car, can be produced in a particularly simple manner during the manufacture by way of the clip system provided by the arrangement 1. Respective motor vehicle components 4 can be connected to one another in a particularly simple manner by means of the clip system.

To produce the respective arrangements 1, respective points 5 at which connecting elements 6 of the connecting device 3 are to be fastened are marked on the motor vehicle component 4. Then, the connecting device 3 is welded onto the motor vehicle component 4, the respective connecting elements 6 of the connecting device 3 being connected in a materially bonded manner to the motor vehicle component 4, in the present case by welding, at the respective pre-marked points 5. The connecting elements 6 of the connecting device 3 are welded to the motor vehicle component 4 in the present case by means of drawn arc welding.

In the present case, each of the respective connecting devices 3 illustrated in FIGS. 1 and 2 comprises two connecting elements 6. In contrast to this, the connecting device 3 may as an alternative have more than two connecting elements 6. In the first embodiment, illustrated in FIG. 1, the two connecting elements 6 of the connecting device 3 are connected to one another, in the present case are welded to one another. In the second embodiment, illustrated in FIG. 2, the connecting elements 6 of the connecting device 3 are welded to the motor vehicle component 4 spaced apart from one another. In the present case, in each of the embodiments, the connecting elements 6 are designed as respective metal spheres or steel spheres. The connecting elements 6 of the connecting device 3, which are welded to the motor vehicle component 4, together with a surface of the motor vehicle component 4 provide a gap 7. The gap 7 runs along the surface of the motor vehicle component 4 and between the connecting elements 6 of the connecting device 3. The gap 7 in the first embodiment, illustrated in FIG. 1, is enclosed at the periphery completely by the connecting elements 6 and the surface of the motor vehicle component 4. In the second embodiment of the arrangement 1, illustrated in FIG. 2, the gap 7 is enclosed by the connecting elements 6 and the surface of the motor vehicle component 4 over a longitudinal region of the periphery.

For a particularly advantageous fastening of the fastening clip 2 to the connecting device 3 welded to the motor vehicle component 4, it is provided that the fastening clip 2 engages behind the connecting device 3 in the gap 7. In the first embodiment, illustrated in FIG. 1, the fastening clip 2 has a cap-shaped basic element 8 and also a retaining element in the form of a securing ring 9. The basic element 8 is fitted over the connecting device 3 on a side of the connecting device 3 that faces away from the motor vehicle component 4. The securing ring 9 is threaded through the gap 7, with the result that the securing ring 9 engages behind the connecting device 3 in the gap 7. In the present case, the basic element 8 has a notch 10 into which the securing ring 9 engages. The securing ring 9 thus lies against the basic element 8 at least in certain regions along the notch 10 and in this way clamps the basic element 8 onto the connecting device 3.

In the second embodiment, illustrated in FIG. 2, the fastening clip 2 comprises the basic element 8 and also an expansion pin 12, which is plugged in an opening 11 in the basic element 8, as retaining element. To fasten the fastening clip 2 in the connecting device 3, the basic element 8 is thus fitted over the connecting device 3 on its side facing away from the motor vehicle component 4 separately from the expansion pin 12. Then, the expansion pin 12 is pushed into the opening 11 in the basic element 8, as a result of which the basic element 8 is spread at least in the region of the gap 7. The spreading of the basic element 8 at least in the region of the gap 7 has the result that the basic element 8 engages behind the connecting device 3 in the gap 7. In the present case, the opening 11 in the basic element 8 runs between the two connecting elements 6 of the connecting device 3 and at the same time perpendicular to a direction of longitudinal extent of the gap 7. In the present case, the expansion pin 12 is plugged into the opening 11 from a side of the basic element 8 that faces away from the motor vehicle component 4.

As an alternative to the connecting elements 6 of the connecting device 3 that are merely arranged next to one another, it is possible for the connecting device 3 to comprise a plurality of connecting elements 6 stacked one on top of another, only two of which are welded to the motor vehicle component 4 and the rest of the connecting elements 6 being arranged on a side of the connecting elements 6 welded to the motor vehicle component 4 that faces away from the motor vehicle component 4. The fastening clip 2 described is thus fastened to the connecting device 3 by way of mechanical locking. The fastening clip 2 may be fastened to the connecting device 3 in particular in such a way that, when the fastening clip 2 is being fastened to the motor vehicle component 4, at least one degree of freedom of the fastening clip 2 relative to the connecting device 3 is enabled and thus is not blocked. In this way, a floating system of the fastening clip 2 on the motor vehicle component 4 can be provided.

The arrangement 1 described allows the fastening clip 2 to be able to be fastened to the motor vehicle component 4 with particularly low pressing forces, particularly high pulling-off forces being required to remove the fastening clip 2 from the motor vehicle component 4, as a result of which a particularly secure fastening of the fastening clip 2 to the motor vehicle component 4 is provided. In addition, the arrangement 1 allows a motor vehicle comprising the motor vehicle component 4 to be produced with particularly few screw connections.

Overall, the invention shows how clips, in the present case the fastening clip 2, which are secure in process terms can be provided.

LIST OF REFERENCE CHARACTERS

1 Arrangement
2 Fastening clip
3 Connecting device
4 Motor vehicle component
5 Point
6 Connecting element
7 Gap
8 Basic element
9 Securing ring
10 Notch
11 Opening
12 Expansion pin

What is claimed is:

1. An arrangement, comprising:
   a fastening clip;
   a connecting device, wherein the connecting device comprises at least two connecting elements; and
   a motor vehicle component, wherein the at least two connecting elements are each welded on the motor vehicle component and are longitudinally disposed next to one another on the motor vehicle component, wherein a gap runs between the at least two connecting elements, and wherein the at least two connecting elements laterally delimit the gap;
   wherein the gap that runs between the at least two connecting elements is delimited by the at least two connecting elements and a surface of the motor vehicle component and wherein the fastening clip engages behind the at least two connecting elements in the gap by a retaining element of the fastening clip that is disposed in the gap;
   wherein the fastening clip further comprises a cap-like basic element which is fitted over the connecting device;
   wherein the retaining element is an expansion pin which is pluggable into an opening in the cap-like basic element.

2. The arrangement according to claim 1, wherein the at least two connecting elements are each a sphere.

3. The arrangement according to claim 1, wherein the opening runs between at least two of the at least two connecting elements.

4. A method for producing the arrangement according to claim 1, comprising the step of:
   plugging the fastening clip onto the connecting device such that the fastening clip engages behind the at least two connecting elements in the gap by disposing the retaining element of the fastening clip in the gap.

* * * * *